United States Patent
Takai (10) Patent No.: US 9,604,286 B2
(45) Date of Patent: Mar. 28, 2017

(54) DRILL

(71) Applicant: Kazuteru Takai, Toyokawa (JP)

(72) Inventor: Kazuteru Takai, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 0 days.

(21) Appl. No.: 14/759,532

(22) PCT Filed: Jan. 29, 2013

(86) PCT No.: PCT/JP2013/051875
§ 371 (c)(1),
(2) Date: Jul. 7, 2015

(87) PCT Pub. No.: WO2014/118881
PCT Pub. Date: Aug. 7, 2014

(65) Prior Publication Data
US 2015/0321267 A1 Nov. 12, 2015

(51) Int. Cl.
*B23B 51/06* (2006.01)
*B23B 51/02* (2006.01)

(52) U.S. Cl.
CPC ............. *B23B 51/06* (2013.01); *B23B 51/02* (2013.01); *B23B 2250/12* (2013.01);
(Continued)

(58) Field of Classification Search
CPC ... B23B 51/06; B23B 2250/12; Y10T 408/45; Y10T 408/455
See application file for complete search history.

(56) References Cited

U.S. PATENT DOCUMENTS 2,986,960 A * 6/1961 Oxford, Jr. ......... B23B 51/0486
408/59
4,813,823 A * 3/1989 Bieneck ................ B21C 23/147
408/144

(Continued)

FOREIGN PATENT DOCUMENTS

AT 386 145 B 7/1988
CN 1367725 A 9/2002

(Continued)

OTHER PUBLICATIONS

Feb. 26, 2013 Search Report issued in International Patent Application No. PCT/JP2013/051875.

(Continued)

*Primary Examiner* — Eric A Gates
(74) *Attorney, Agent, or Firm* — Oliff PLC (57) ABSTRACT

A drill with a cutting fluid supply hole includes: a tool main-body with an axial end cutting-edge, a portion having a discharge flute on a main-body distal end side portion, and a cutting fluid supply hole, the hole having a fan-shaped cross section defined by a front inner-wall surface located along a main-body radial direction on the front side in the drill rotation direction, a rear inner-wall surface located along the radial-direction on the rear side in the drill rotation direction and facing the front inner-wall surface in a main-body circumferential direction, an outer circumferential inner-wall surface made up of a partially cylindrical surface around a drill center line, and an inner circumferential inner-wall surface made up of a partially cylindrical surface around the center line with a curvature radius smaller than that of the outer circumferential inner-wall surface and facing the outer circumferential inner-wall surface in the radial direction.

4 Claims, 11 Drawing Sheets (52) U.S. Cl.
CPC ... *B23B 2251/408* (2013.01); *B23B 2260/082* (2013.01); *Y10T 408/455* (2015.01)

(56) References Cited

U.S. PATENT DOCUMENTS

| | | | |
|---|---|---|---|
| 4,826,364 A | 5/1989 | Grunsky | |
| 6,698,981 B1 | 3/2004 | Beno et al. | |
| 6,948,890 B2 * | 9/2005 | Svensson | B23B 51/0486 408/56 |
| 7,393,162 B2 * | 7/2008 | Hecht | B23B 51/0486 408/1 R |
| 7,901,163 B2 * | 3/2011 | Nomura | B23B 51/0486 408/144 |
| 9,079,255 B2 * | 7/2015 | Jager | B23B 51/02 |
| 2003/0103820 A1 | 6/2003 | Frejd | |
| 2005/0047879 A1 | 3/2005 | Svensson et al. | |
| 2005/0244235 A1 | 11/2005 | Kleiner | |
| 2006/0006576 A1 | 1/2006 | Karos | |
| 2008/0131221 A1 | 6/2008 | Yanagida et al. | |
| 2010/0296884 A1 | 11/2010 | Okumura | |
| 2011/0211924 A1 | 9/2011 | Yanagida et al. | |
| 2012/0003054 A1 | 1/2012 | Takagi et al. | |
| 2012/0082524 A1 | 4/2012 | Matsuda et al. | |
| 2012/0308319 A1 | 12/2012 | Sampath et al. | |
| 2013/0223943 A1* | 8/2013 | Gey | B23B 51/06 408/59 |
| 2016/0031016 A1 | 2/2016 | Takai | |

FOREIGN PATENT DOCUMENTS

| | | |
|---|---|---|
| CN | 1575216 A | 2/2005 |
| CN | 101939126 A | 1/2011 |
| CN | 201815724 U | 5/2011 |
| CN | 102149497 A | 8/2011 |
| CN | 102806375 A | 12/2012 |
| DE | 203 16 884 U1 | 2/2004 |
| DE | 20219824 U1 | 4/2004 |
| EP | 0257372 A1 | 3/1988 |
| EP | 1428601 A1 * | 6/2004 ......... B23B 51/0486 |
| EP | 2 527 065 A1 | 11/2012 |
| EP | 2952278 A1 | 12/2015 |
| JP | 62136306 A * | 6/1987 |
| JP | S62-136306 A | 6/1987 |
| JP | S63-62604 A | 3/1988 |
| JP | S63-216611 A | 9/1988 |
| JP | H08-39319 A | 2/1996 |
| JP | 2004-130411 A | 4/2004 |
| JP | 2006-510494 A | 3/2006 |
| JP | 2008-137125 A | 6/2008 |
| JP | 2009-083092 A | 4/2009 |
| JP | WO 2011132686 A1 * | 10/2011 ............ B23B 51/06 |
| JP | 2012-056069 A | 3/2012 |
| KR | 2012-0023779 A | 3/2012 |
| WO | 2004/056513 A2 | 7/2004 |
| WO | 2010/095249 A1 | 8/2010 |
| WO | 2010/146839 A1 | 12/2010 |
| WO | 2011/132686 A1 | 10/2011 |

OTHER PUBLICATIONS

Jun. 2, 2016 Office Action issued in Chinese Patent Application No. 201380071690.3.
Jul. 29, 2016 Office Action issued in U.S. Appl. No. 14/775,462.
Apr. 23, 2013 International Search Report issued in International Patent Application No. PCT/JP2013/058794.
Jun. 3, 2016 Office Action issued in Chinese Patent Application No. 201380075081.5.
Aug. 18, 2016 Search Report issued in European Patent Application No. 13873278.9.
Oct. 17, 2016 Extended European Search Report issued in European Patent Application No. 13879777.4.
Nov. 29, 2016 Office Action issued in Chinese Patent Application No. 201380075081.5.
Dec. 21, 2016 Office Action issued in Korean Patent Application No. 2015-7027518.
Dec. 19, 2016 Office Action issued in Korean Patent Application No. 2015-7019975.
Dec. 12, 2016 Notice of Allowance issued in U.S. Appl. No. 14/775,462.
Jan. 22, 2017 Office Action issued in Chinese Patent Application No. 201380071690.3.

* cited by examiner

DRILL

TECHNICAL FIELD

The present invention relates to a drill with a cutting fluid supply hole for drilling by cutting and is particularly related to a technique of supplying cutting fluid as much as possible.

BACKGROUND ART

A drill with a cutting fluid supply hole frequently used as a tool for drilling has a shaft-shaped tool main body provided with a cutting edge at its distal end portion, a flute portion having a discharge flute formed on a distal-end-side portion of the shaft-shaped tool main body for discharging chips generated by the cutting edge, and the cutting fluid supply hole for supplying cutting fluid toward the cutting edge provided at the end portion, through an inside of the flute portion.

Drills described in Patent Documents 1 to 3 are examples thereof. Since oily or aqueous cutting fluid is supplied near the cutting edge through the cutting fluid supply hole in the vicinity of a cutting point of the cutting edge, the drills described in Patent Documents 1 to 3 suppress a temperature increase at a machining point and prevent chipping, damaging, breakage, and burning of the cutting edge, a flank thereof, a corner portion, and a chisel edge as depicted in FIGS. 15, 16, 17, and 18 to enhance the durability of the drill. Particularly if a work material is a difficult-to-cut material such as stainless steel and titanium alloy, such an effect is expected.

PRIOR ART DOCUMENT

Patent Documents

Patent Document 1: Japanese Laid-Open Patent Publication No. 2004-130411
Patent Document 2: Japanese Laid-Open Patent Publication No. 2008-137125
Patent Document 3: Japanese Laid-Open Patent Publication No. 2009-083092

SUMMARY OF THE INVENTION

Problem to be Solved by the Invention

When an amount of cutting fluid supplied near a cutting edge is larger, the chipping, breakage, and burning of the cutting edge and the flank thereof are more suppressed and a larger effect of enhancing the durability of the drill is acquired. If it is attempt to increase a cross-sectional area of a cutting fluid supply hole for this reason, the drill could be easily broken because of impaired rigidity and strength and, therefore, it is desired to make the cross-sectional area of the cutting fluid supply hole as large as possible without reducing the rigidity of the drill.

However, since the conventional drills described in Patent Documents 1 to 3 have the cutting fluid supply holes formed into a round cross-sectional shape, an amount of the cutting fluid supplied near the cutting edge is not necessarily sufficient. In this regard, it is conceivable that a supply pressure of the cutting fluid is made higher; however, it is problematic that this necessitates a pump for making a supply original pressure higher, a tool chuck, and equipment reconstruction such as enhancement of withstanding pressure of pipes connected thereto.

The present invention was conceived in view of the above-described situations and it is therefore an object of the present invention to provide a drill providing a sufficient supply amount of cutting fluid through a cutting fluid supply hole without increasing a cutting fluid supply pressure without reducing the rigidity of the drill.

As a result of various studies in view of the above-described situations, the present inventor found out that when a cross-sectional shape of the cutting fluid supply hole is formed into a fan shape having a fan-shaped cross section defined by a front inner wall surface located along a radial direction of the tool main body on a front side in a rotation direction of the drill, a rear inner wall surface located along the radial direction on a rear side of the rotation direction of the drill and facing the front inner wall surface in a circumferential direction of the tool main body, an outer circumferential inner wall surface made up of a partially cylindrical surface around a center line of the drill, and an inner circumferential inner wall surface made up of a partially cylindrical surface around the center line of the drill with a curvature radius that is smaller than the outer circumferential inner wall surface and facing the outer circumferential inner wall surface in the radial direction, a flow speed of the cutting fluid can be increased without raising a supply original pressure as compared to a conventional shape having the same cross-sectional area, and a supply amount of the cutting fluid can be made larger without increasing the cross-sectional area of the cutting fluid supply hole. The present invention was conceived based on this knowledge.

Means for Solving the Problem

That is, the present invention is a drill with a cutting fluid supply hole comprising: a tool main body provided with a cutting edge that is located at an axial end thereof, a flute portion having a discharge flute formed on a distal end side portion of the tool main body for discharging chips generated by the cutting edge, and a cutting fluid supply hole for supplying cutting fluid toward the cutting edge through the inside of the flute portion, the cutting fluid supply hole having a fan-shaped cross section defined by a front inner wall surface located along a radial direction of the tool main body on the front side in the rotation direction of the drill, a rear inner wall surface located along the radial direction on the rear side in the rotation direction of the drill and facing the front inner wall surface in a circumferential direction of the tool main body, an outer circumferential inner wall surface made up of a partially cylindrical surface around a center line of the drill, and an inner circumferential inner wall surface made up of a partially cylindrical surface around the center line of the drill with a curvature radius that is smaller than a curvature radius of the outer circumferential inner wall surface and facing the outer circumferential inner wall surface in the radial direction.

Effects of the Invention

According to the drill with a cutting fluid supply hole of the present invention configured as described above, the cutting fluid supply hole provided in the inside of the flute portion has a fan-shaped cross section defined by a front inner wall surface located along a radial direction of the tool main body on the front side in the rotation direction of the drill, a rear inner wall surface located along the radial direction on the rear side in the rotation direction of the drill and facing the front inner wall surface in a circumferential direction of the tool main body, an outer circumferential inner wall surface made up of a partially cylindrical surface around a center line of the drill, and an inner circumferential inner wall surface made up of a partially cylindrical surface around the center line of the drill with a curvature radius that is smaller than a curvature radius of the outer circumferential inner wall surface and facing the outer circumferential inner wall surface in the radial direction and, therefore, the web thickness can be made large enough and the tool rigidity is not reduced. As compared to the round-shaped conventional cutting fluid supply hole having the same cross-cross sectional area, the width of the cutting fluid supply hole is more increased as viewed in a direction toward the outer circumferential side, so that the pressure based on the centrifugal force is made higher. Thus, the speed of the cutting fluid in the cutting fluid supply hole can be increased without raising the supply pressure of the cutting fluid, and the supply amount of the cutting fluid is increased by utilizing the centrifuging force associated with the rotation of the drill.

Preferably, the drill is two-flute and an angle defined by the front inner wall surface and the rear inner wall surface is 20° to 50° in a cross section orthogonal to a rotation center of the drill, and where a diameter of the drill is represented by D, the curvature radius of the outer circumferential inner wall surface is 0.25D to 0.35D while the curvature radius of the inner circumferential inner wall surface is preferably 0.15D to 0.20D. As described above, since the inner circumferential inner wall surface is a partially cylindrical surface with the curvature radius whose center lies on the rotation center line, the web thickness of the drill can be made large enough and, therefore, the tool rigidity, or particularly, the bending rigidity is not reduced. If the curvature radius of the outer circumferential inner wall surface falls below 0.25D or the curvature radius of the inner circumferential inner wall surface falls below 0.15D, the web thickness of the drill and the cross-sectional area of the cutting fluid supply hole are difficult to be made large enough. Conversely, if the curvature radius of the outer circumferential inner wall surface exceeds 0.35D or the curvature radius of the inner circumferential inner wall surface exceeds 0.20D, the position of the cutting fluid supply hole in the land is offset toward the outer circumferential side and the strength of the drill is difficult to be made large enough.

Preferably, the drill is two-flute and where a reference line is a straight line connecting the center line of the drill and a radially outermost point of one of side-wall surfaces which define the discharge flute and which are opposed to each other in the rotation direction, an angle of 20° to 50° is defined by the reference line and a straight line indicative of a half angle of the angle defined by the front inner wall surface and the rear inner wall surface. As a result, the cutting fluid supply hole is located at a circumferentially center portion of the land and, therefore, the tool rigidity is not reduced. If the angle that is defined by the reference line and a straight line indicative of a half angle of the angle defined by the front inner wall surface and the rear inner wall surface falls below 20° or exceeds 50°, the cutting fluid supply hole is located close to the discharge flute in the circumferential direction in the land and, therefore, the tool rigidity may be reduced.

Preferably, adjacent surfaces are smoothly connected to each other through a fillet of a curvature radius of 0.015D to 0.045D, the adjacent surfaces being each adjacent two of the front inner wall surface, the rear inner wall surface, the outer circumferential inner wall surface and the inner circumferential inner wall surface, which are adjacent to each other.

Therefore, since the adjacent surfaces are connected though the fillet, reduction of the tool rigidity is suppressed. If the curvature radius of the fillet falls below 0.015D, the tool rigidity may be reduced. If the curvature radius of the fillet exceeds 0.045D, it is difficult to obtain the cross-sectional area of the cutting fluid supply hole while maintaining the tool rigidity and the flow speed.

MODE FOR CARRYING OUT THE INVENTION

An example of the present invention will now be described in detail with reference to the drawings.

Example

Figure 1:
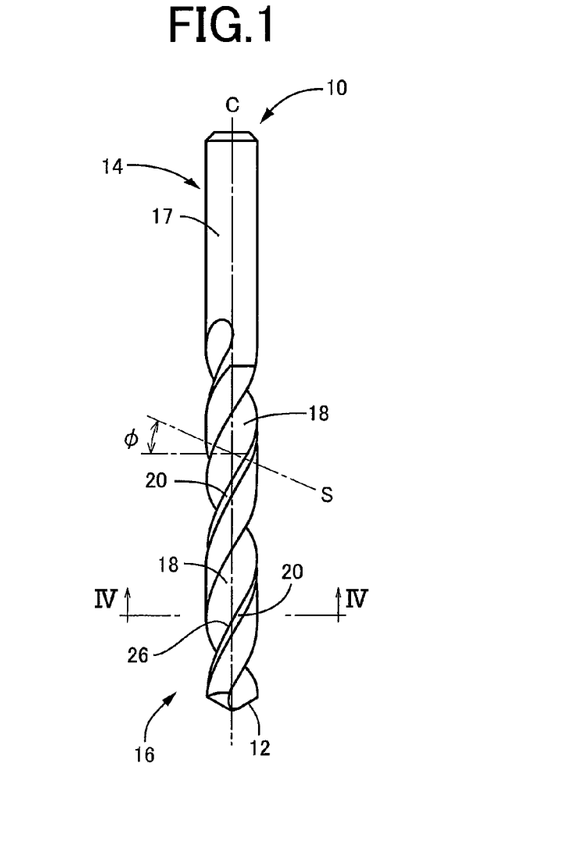
FIG. 1 is a front view of a drill that is an example of the present invention.
Figure 2:
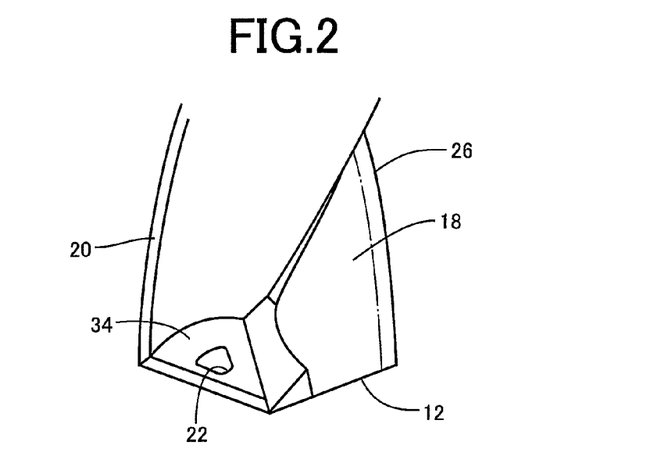
FIG. 2 is an enlarged view showing, in enlargement, a distal end of the drill that is an example of FIG. 1.
Figure 3:
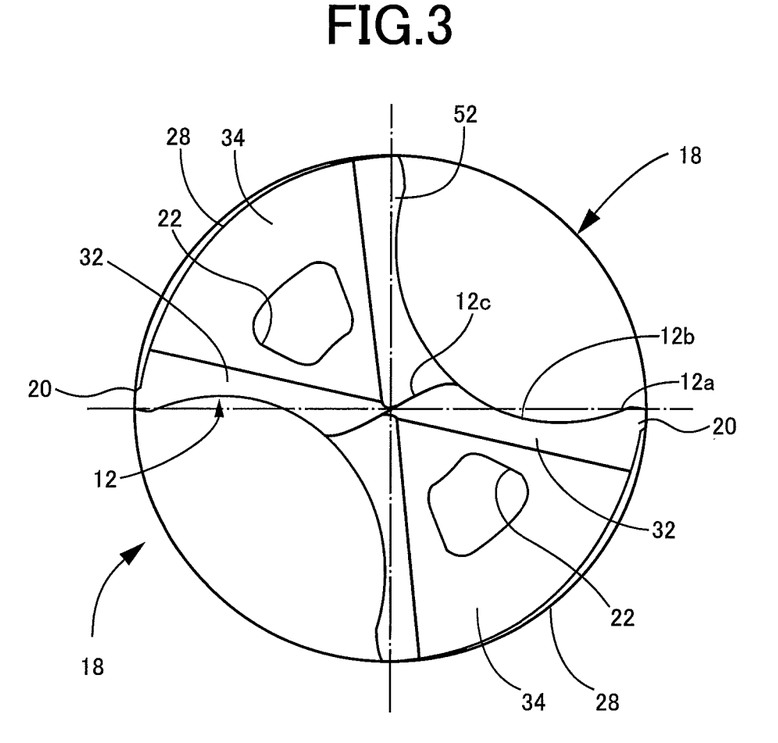
FIG. 3 is an enlarged view showing, in enlargement, a distal end surface of the drill that is an example of FIG. 1 seen from the one end.

FIG. 1 is a diagram of a drill 10 that is an example of the present invention and is a front view as seen in a direction orthogonal to an axial center C. FIG. 2 is an enlarged view showing, in enlargement, a distal end portion provided with a cutting edge 12 of the drill 10. FIG. 3 is an enlarged view showing, in enlargement, a distal end surface provided with the cutting edge 12 of the drill 10.

The drill 10 is a two-flute twist drill and includes a shank portion 14 and a flute portion 16 that are integral and adjacent in an axial direction of a shaft-shaped tool main body 17. The drill 10 is made of cemented carbide, and the surfaces of the distal end portion provided with the cutting edges 12 etc. and the flute portion 16 provided with the discharge flutes 18 for chips generated by the cutting edges 12 are coated with a hard film of TiAlN alloy. The flute portion 16 has the pair of discharge flutes 18 which are twisted clockwise around the axial center C at a predetermined helix angle γ (e.g., about 30°) and which are formed at respective positions that are point-symmetrical to each other with respect to the axial center C, and margins 20 are disposed along the chip discharge flutes 18. The pair of the chip discharge flutes 18 is opened in a C-shape in the tapered distal end surface of the drill 10. The respective cutting edges 12 are disposed on the opening edges of the chip discharge flutes 18 which are located at the axially distal end, such that each of the cutting edges 12 is located in a portion of the corresponding opening edge, which faces forward in the rotation direction of the drill 10.

Each of margins 20 is disposed along a leading edge 26 provided by one of opposite end edges of a corresponding one of lands 24 which is separated by a corresponding one of the chip discharge flutes 18 from another one of the lands 24, wherein the one of the opposite end edges is on a front side of the other in the drill rotation direction. Each margin 20 has a width of 1.2 mm and is slightly projected outward by about 0.4 mm, for example. An outer circumferential surface of the drill 10 is made up of outer circumferential surfaces of the margins 20 and relieving surfaces 28 each of which is contiguous to the corresponding margin 20 and has a constant radial dimension. The outer diameter defined by the margins 20 is substantially the same dimension as a drill diameter (outer diameter defined by the cutting edges 12) D measured at the distal end portion of the drill 10, and is gradually reduced as viewed in a direction away from the distal end portion of the drill 10 toward the shank portion 14 owing to a predetermined degree of back taper.

Each of cutting edges 12 is made up of a convexly-curved cutting edge portion 12a formed on the outer circumferential side and a concavely-curved cutting edge portion 12b formed on the inner circumferential side. On the tapered distal end surface of the drill 10, there are a second flank 32 and a third flank 34 that are provided on the rear side of each of cutting edges 12 in the rotation direction. The third flank 34 has an opening of a cutting fluid supply hole 22 that extends helically and longitudinally through the drill 10 in substantially parallel with the discharge flutes 18 such that cutting fluid or air can be supplied to a cutting part as needed. An axial-center-side portion, i.e., a web portion, of each of the cutting edges 12 is subjected to R-type thinning such that an R-shaped axial-center-side cutting edge portion 12c is smoothly curved and smoothly connected to the concavely-curved cutting edge portion 12b, as shown in the bottom view of FIG. 3.

Figure 4:
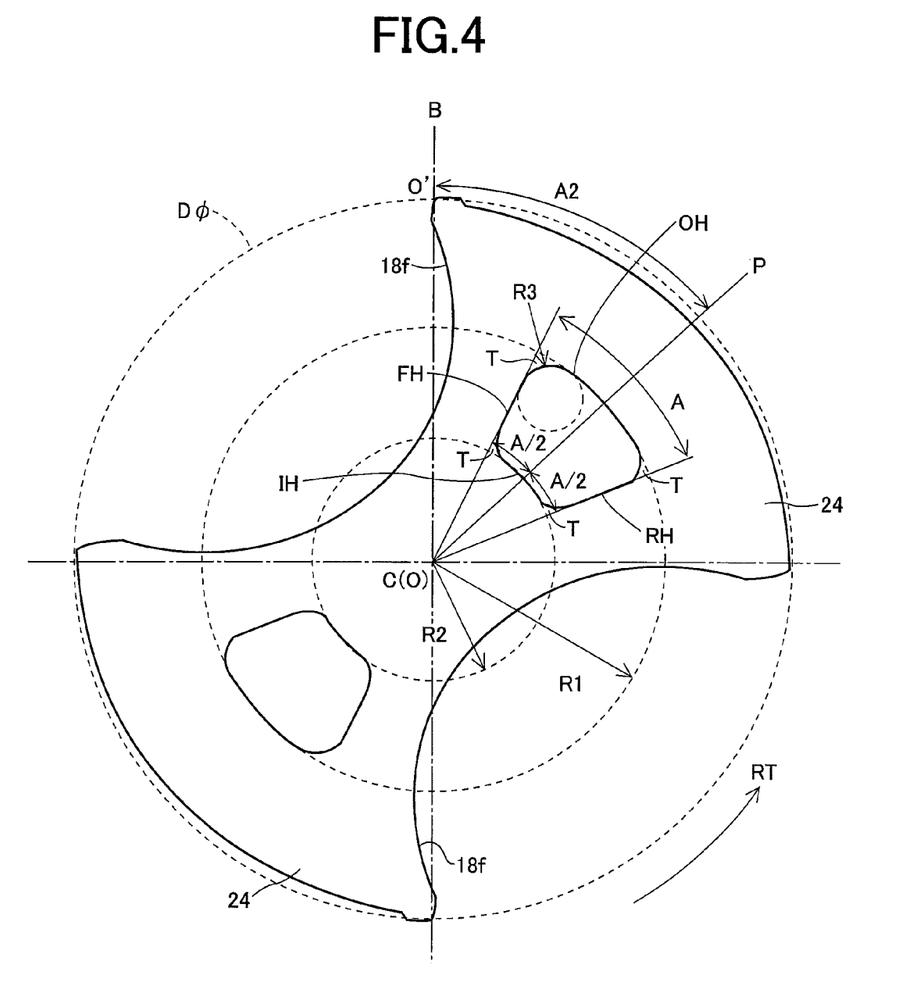
FIG. 4 is a view for explaining a cross-sectional shape of each of the cutting fluid supply holes in a cross section orthogonal to an axial center C of the drill of FIG. 1, the cross-sectional view taken along IV-IV of FIG. 1.

FIG. 4 is a cross-sectional view of the flute portion 16 of the drill 10, which is taken on a plane orthogonal to the axial center C, for explaining a cross-sectional shape of each of the cutting fluid supply holes 22 disposed in the flute portion 16, i.e., in the corresponding land 24. In FIG. 4, each cutting fluid supply hole 22 has a fan-shaped cross section defined by a front inner wall surface FH located along a radial direction of the tool main body 17 on a front side of a rotation direction RT of the drill 10; a rear inner wall surface RH located along the radial direction on a rear side of the rotation direction RT of the drill 10 and facing the front inner wall surface FH in a circumferential direction of the tool main body 17; an outer circumferential inner wall surface OH made up of a partially cylindrical surface around a center line C, i.e., a center O, of the drill 10; and an inner circumferential inner wall surface IH made up of a partially cylindrical surface around the center line C of the drill 10 with a curvature radius R2 that is smaller than a curvature radius R1 of the outer circumferential inner wall surface OH and facing the outer circumferential inner wall surface OH in the radial direction.

On the cross section orthogonal to the rotation center line C, as shown in FIG. 4, an angle A defined by the front inner wall surface FH and the rear inner wall surface RH is preferably 20° to 50°. Where the diameter of the drill 10 is represented by D, the curvature radius R1 of the outer circumferential inner wall surface OH is preferably 0.25D to 0.35D, while the curvature radius R2 of the inner circumferential inner wall surface IH is preferably 0.15D to 0.20D. A corner between each adjacent two of the front inner wall surface FH, the rear inner wall surface RH, the outer circumferential inner wall surface OH, and the inner circumferential inner wall surface IH is not a sharp corner, and each adjacent two of the inner wall surfaces are smoothly connected to each other via a fillet T preferably having a curvature radius R3 of 0.015D to 0.045D. Where a reference line B is a straight line connecting the center line C of the drill 10 and a radially outermost point O' of one of wall surfaces defining the discharge flute 18, i.e., a wall surface 18f facing forward in the rotation direction RT, an angle A2 defined by the reference line OO' and a straight line OP indicative of a half angle A/2 of the angle A that is defined between the front inner wall surface FH and the rear inner wall surface RH is preferably 20° to 50°, more preferably 40° to 45°.

Figure 5:
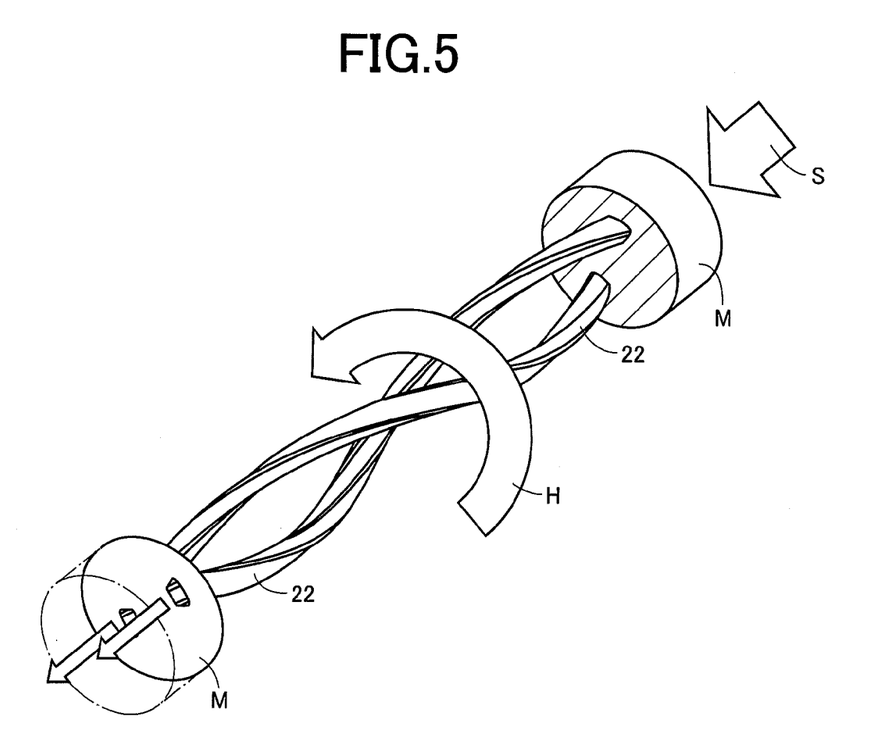
FIG. 5 is a perspective view for explaining a spiral shape of the cutting fluid supply holes of FIG. 4.

The drill 10 configured as described above is manufactured through normal grooving/polishing processing, final polishing processing, and cutting-edge polishing processing that are applied to a bar-shaped material M. The bar-shaped material M is formed by extruding a steel material (e.g., high-speed steel) softened at high temperature, through a forming die with a pair of cores having the same cross-sectional shape as the cutting fluid supply hole 22 in a circular forming space, and pulling the steel material out from the forming die in a twisted manner. FIG. 5 is a diagram of the two cutting fluid supply holes 22 formed in the bar-shaped material with a longitudinally intermediate portion of the bar-shaped material M being removed, wherein arrows S and H indicate an extrusion direction and a twist direction, respectively.

[Test of Coolant Ejection Amount During Cutting]

A cutting fluid supply amount test conducted by the present inventor will hereinafter be described.

(Test Tools)

Figure 10:
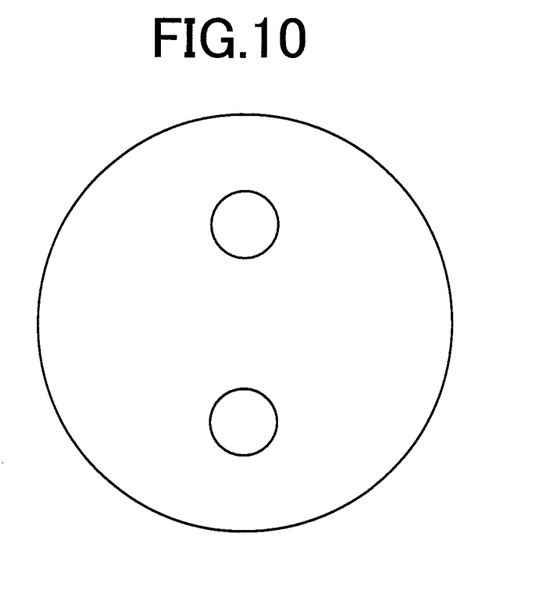
FIG. 10 is a cross-sectional view for explaining a shape of a round cross section of the cutting fluid supply hole of the prototype which measured a cutting fluid ejection amount.
Figure 12:
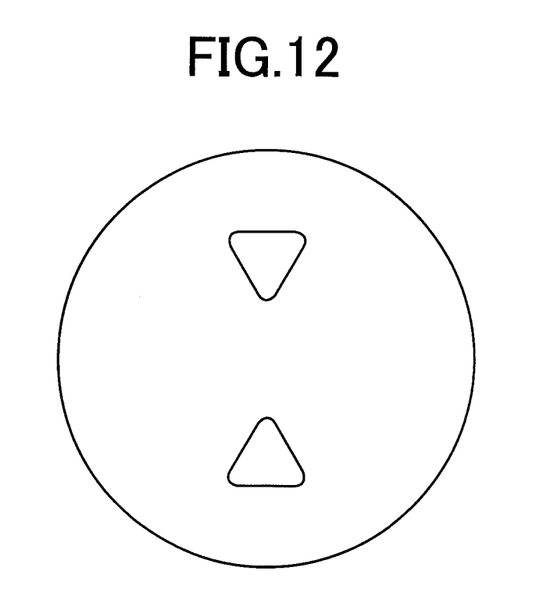
FIG. 12 is a cross-sectional view for explaining a shape of an inverted triangular cross section of the cutting fluid supply hole of the prototype which measured a cutting fluid ejection amount.
Figure 13:
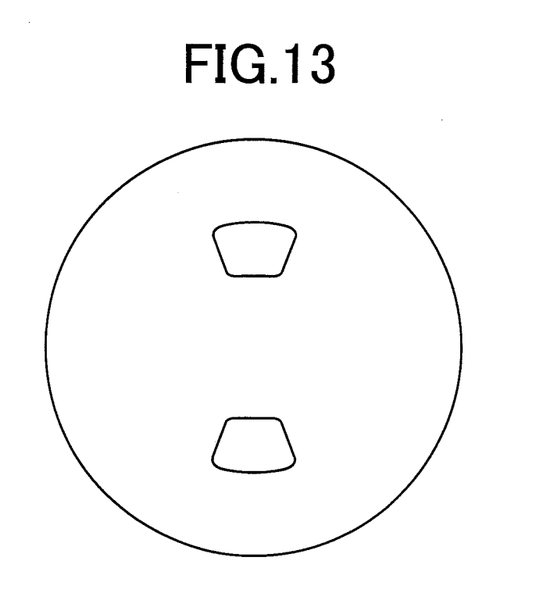
FIG. 13 is a cross-sectional view for explaining a shape of a fan-shaped cross section of the cutting fluid supply hole of the prototype which measured a cutting fluid ejection amount.

First, the inventor fabricated three types of test tools having a dill diameter of ø10 mm, a flute length of 80 mm, and a total cross-sectional area of 4.9 mm² for two cutting fluid supply holes, i.e., a conventional product (conventional drill) having the cutting fluid supply holes with a round cross section as depicted in FIG. 10, for example; a comparison product (similar drill) having the cutting fluid supply holes with an inverted triangular cross section as depicted in FIG. 12, for example; and an inventive product having the cutting fluid supply holes with a fan-shaped cross section as depicted in FIGS. 4 and 13, for example. The hole shapes are indicated in units of mm.

(Hole Shapes)

| conventional product | comparison product | inventive product | | | |
|---|---|---|---|---|---|
| ød | PSD | R1 | R2 | R3 | A |
| 1.77 | 4.8 | 3.18 | 1.65 | 0.37 | 40° |

(Test Condition)

Figure 6:
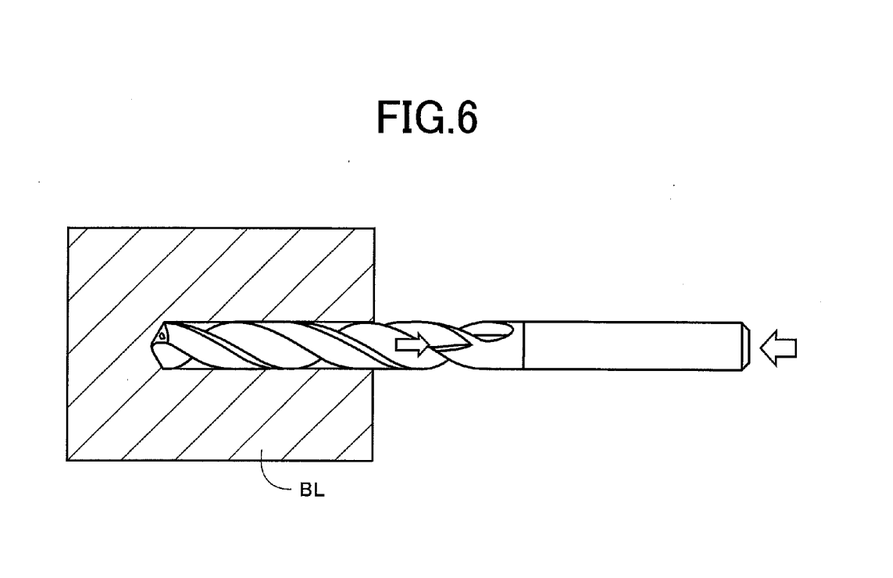
FIG. 6 is a view for explaining a measurement test condition of the cutting fluid ejection amount.

As depicted in FIG. 6, while a distal end of a test drill was thrust into a work material BL by 55 mm and the test drill was rotated at 2228 $min^{-1}$, normal-temperature coolant was supplied from a shank end at a pressure of 1.5 MP such that the coolant ejected from the distal end of the test drill is discharged through the chip discharge flute 18 and a gap between the drill 10 and the work material BL, and the discharged coolant was collected to measure a coolant ejection amount in this case.

Figure 7:
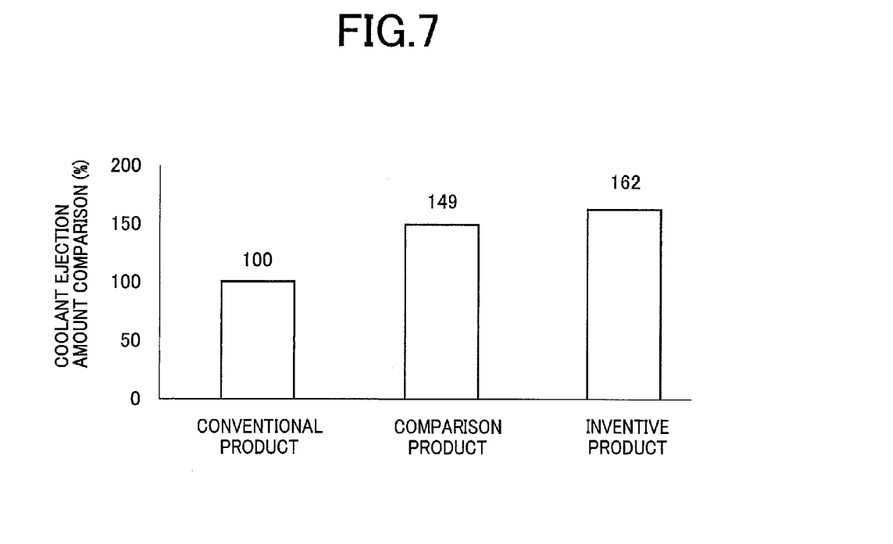
FIG. 7 is a graph for showing a measurement result of the ejection amount of the cutting fluid of FIG. 6 for each cross-sectional shape of the cutting fluid supply holes.

FIG. 7 depicts the coolant ejection amounts measured under the test condition for the comparison product having the cutting fluid supply holes with an inverted triangular cross section and the inventive product having the cutting fluid supply holes with a fan-shaped cross section, relative to the conventional product having the cutting fluid supply holes with a round cross section, which is presented as 100. As apparent from FIG. 7, even though the cross-sectional areas are the same, the coolant ejection amount of the comparison product is increased by 49% and the coolant ejection amount of the inventive product is increased by 62%, as compared to the conventional product having the cutting fluid supply holes with a round cross section. This is considered to be because a pressure is made higher on the outer circumferential side portion of the cross section of the cutting fluid supply holes due to the effect of a centrifugal force and a flow speed is accordingly increased. This is also considered to be because the inventive product having the cutting fluid supply holes with a fan-shaped cross section has a relatively high proportion of a portion of the cross section of each cutting fluid supply hole which is located on the outer circumferential side as compared to the comparison product having the cutting fluid supply holes with an inverted triangular cross section, even though a distance from the drill outer circumferential surface to the outer circumferential inner wall surface is the same.

[Tool Bending Strength Test]

A tool bending strength test conducted by the present inventor will be described. The test tools, the cross section areas of the cutting fluid supply holes, and the shapes of the cutting fluid supply holes used in this test are the same as the coolant ejection amount test.

(Test Condition)

Figure 8:
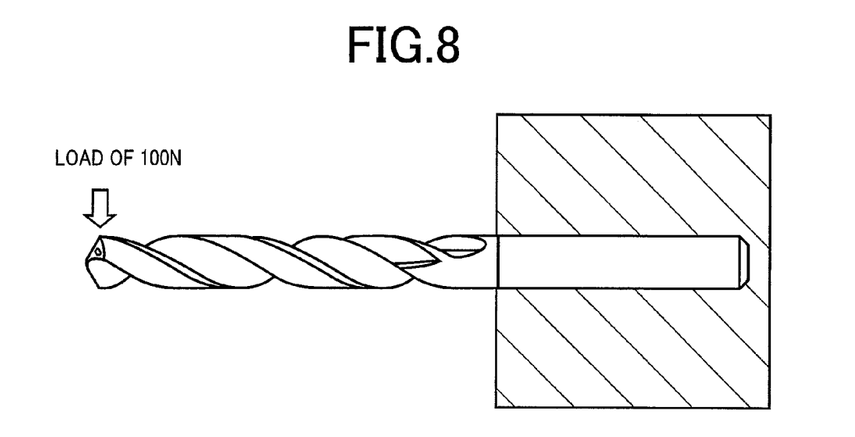
FIG. 8 is a view for explaining a measurement test condition of bending strength of the drill.

As depicted in FIG. 8, when a shank portion of a test drill was completely constrained by using a holding device F and a load of 100 N was applied to the distal end of the test drill in the direction orthogonal to the axial center thereof, a displacement of the distal end of the test drill was measured by a displacement meter capable of measurement in μm.

Figure 9:
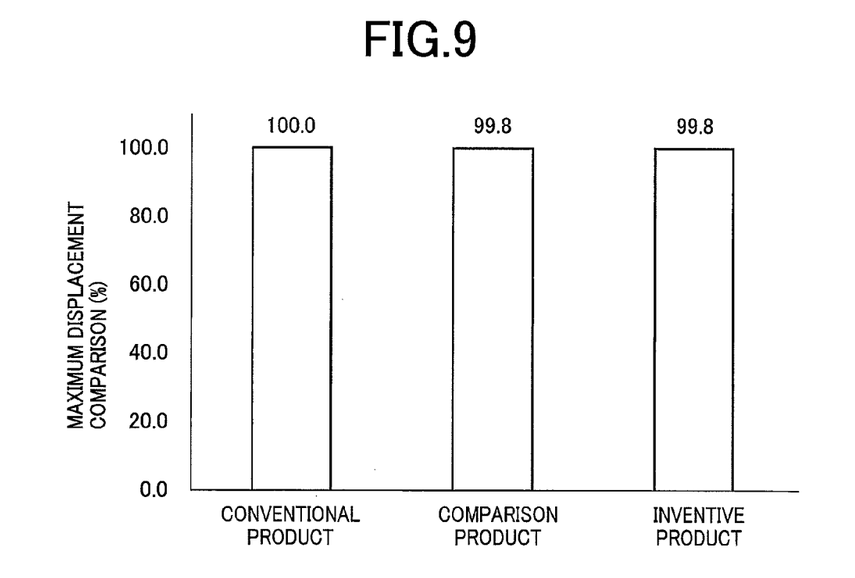
FIG. 9 is a graph for showing a measurement result of the bending strength of the drill of FIG. 8 for each cross-sectional shape of the cutting fluid supply holes.

FIG. 9 depicts the displacements of the distal ends of the test drills measured under the test condition for the comparison product having the cutting fluid supply holes with an inverted triangular cross section and the inventive product having the cutting fluid supply holes with a fan-shaped cross section, relative to the conventional product having the cutting fluid supply holes with a round cross section, which is presented as 100. As apparent from FIG. 9, as compared to the conventional product having the cutting fluid supply holes with a round cross section, the distal end displacement was 99.8 in the comparison product having the cutting fluid supply holes with the same cross-sectional area and the distal end displacement was 99.8 also in the inventive product. From the above, it was confirmed that the comparison product having the cutting fluid supply holes with an inverted triangular cross section and the inventive product having the cutting fluid supply holes with a fan-shaped cross section had the bending strength or the bending rigidity same as the conventional product having the cutting fluid supply holes with a round cross section.

[CAE Analysis Test of Coolant Ejection Amount]

Figure 11:
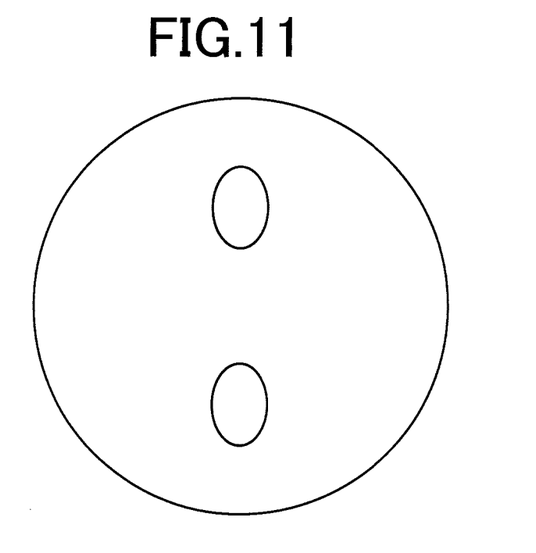
FIG. 11 is a cross-sectional view for explaining a shape of an elliptic cross section of the cutting fluid supply hole of the prototype which measured a cutting fluid ejection amount.

First, in four types of drills having a dill diameter of ø10 mm and a total cross-sectional area of 4.08 $mm^2$ for two cutting fluid supply holes, i.e., a conventional product (conventional drill) having the cutting fluid supply holes with a round cross section depicted in FIG. 10, a comparison product 1 having the cutting fluid supply holes with an elliptic cross section depicted in FIG. 11, a comparison product 2 having the cutting fluid supply holes with an inverted triangular cross section depicted in FIG. 12, and an inventive product having the cutting fluid supply holes with the fan-shaped cross section depicted in FIG. 13 same as FIG. 4, water at 25° C. was supplied at a pressure of 1.5 MPa to each of the cutting fluid supply holes formed in the drill axial length of 50 mm from one end thereof to obtain the pressure distribution of the cutting fluid in the cross-sectional area S of the cutting fluid supply hole from the supply pressure and centrifugal force when the drills are rotating at 2228 $min^{-1}$, and the flow speed distribution and the average flow speed V of the cutting fluid were obtained from the pressure distribution to calculate an ejection amount Q (=S×V) of the cutting fluid ejected from the other end of the cutting fluid supply hole by using CAE analysis.

Figure 14:
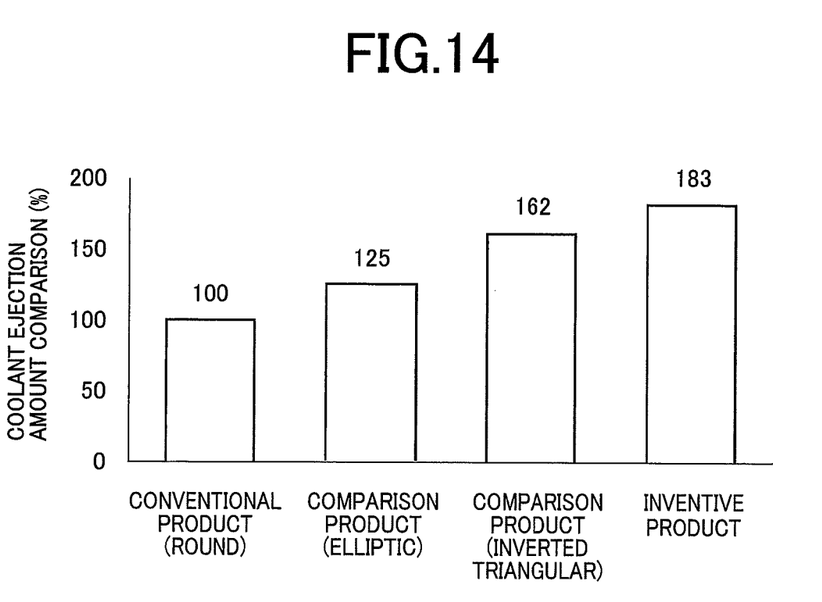
FIG. 14 is a graph for showing a result of calculation of a cutting fluid ejection amount by CAE analysis for each cross-sectional shape of the cutting fluid supply holes.
Figure 15:
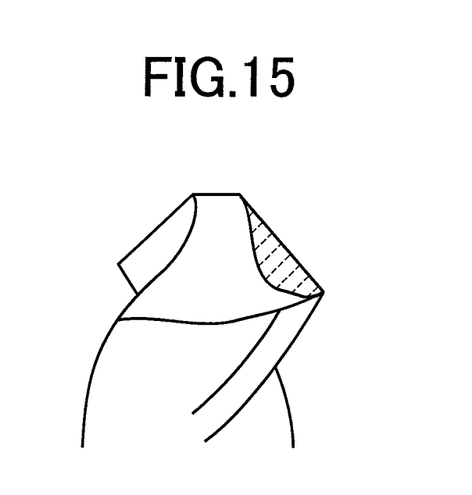
FIG. 15 is a perspective view for explaining a main portion of an abrasion of a flank that is one of damage forms of the drill.
Figure 16:
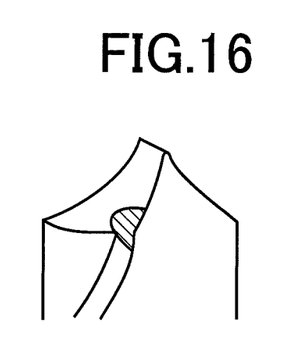
FIG. 16 is a perspective view for explaining a main portion of damaging of a corner portion that is one of damage forms of the drill.
Figure 17:
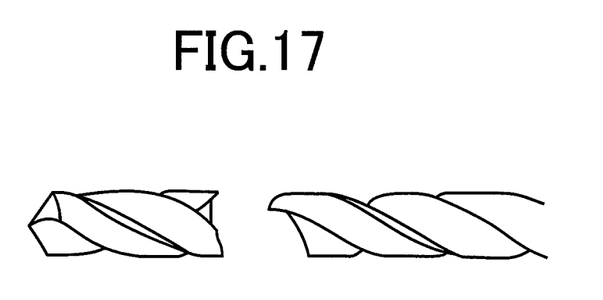
FIG. 17 is a view for explaining a main portion of breakage that is one of damage forms of the drill.
Figure 18:
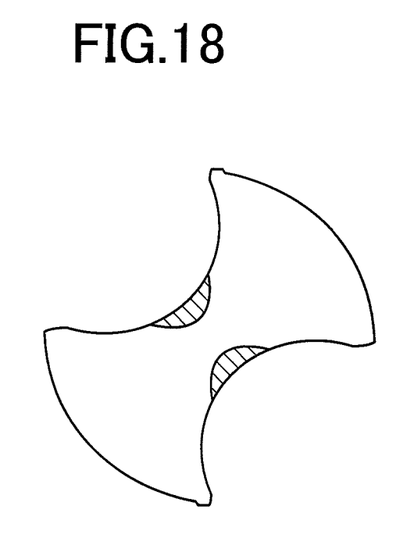
FIG. 18 is a view of an end surface for explaining a main portion of a break of a center portion that is one of damage forms of the drill.

FIG. 14 depicts the coolant ejection amounts measured under the CAE analysis condition for the comparison product 1 having the cutting fluid supply holes with an elliptic cross section, the comparison product 2 having the cutting fluid supply holes with an inverted triangular cross section, and the inventive product having the cutting fluid supply holes with a fan-shaped cross section, relative to the conventional product having the cutting fluid supply holes with a round cross section, which is presented as 100. As apparent from FIG. 14, even though the cross-sectional areas are the same, the coolant ejection amounts of the comparison products 1 and 2 are increased by 25% and 62%, respectively, and the coolant ejection amount of the inventive product is increased by 83% as compared to the conventional product having the cutting fluid supply holes with a round cross section. This is considered to be because a pressure is made higher on the outer circumferential side portion of the cross section of the cutting fluid supply holes due to the effect of a centrifugal force and a flow speed is accordingly increased. This is also considered to be because the inventive product having the cutting fluid supply holes with a fan-shaped cross section has a relatively high proportion of a portion of the cross section of each cutting fluid supply hole which is located on the outer circumferential side as compared to the comparison product 1 having the cutting fluid supply holes with an elliptic cross section and the comparison product 2 having the cutting fluid supply holes with an inverted triangular cross section, even though a distance from the drill outer circumferential surface to the outer circumferential inner wall surface is the same.

As described above, according to the drill 10 with the cutting fluid supply hole of this example, the cutting fluid supply hole 22 disposed in the flute portion 16 has a fan-shaped cross section defined by the front inner wall surface FH located along the radial direction in the front side of the rotation direction RT of the drill 10, the rear inner wall surface RH located along the radial direction on the rear side in the rotation direction RT of the drill 10 and facing the front inner wall surface FH in the circumferential direction, the outer circumferential inner wall surface OH made up of a partially cylindrical surface around the center line C of the drill 10, and the inner circumferential inner wall surface IH made up of a partially cylindrical surface around the center line C of the drill 10 with the curvature radius R2 smaller than the curvature radius R1 of the outer circumferential inner wall surface OH and facing the outer circumferential inner wall surface OH in the radial direction and, therefore, the web thickness can be made large enough and the tool rigidity is not reduced. As compared to the round-shaped conventional cutting fluid supply hole having the same cross-cross sectional area, the width of the cutting fluid supply hole is more increased as viewed in a direction toward the outer circumferential side, so that the pressure based on the centrifugal force is made higher. Thus, the speed of the cutting fluid in the cutting fluid supply hole 22 can be increased without raising the supply pressure of the cutting fluid, and the supply amount of the cutting fluid is increased by utilizing the centrifuging force associated with the rotation of the drill 10.

According to the drill 10 with the cutting fluid supply hole of this example, the angle A defined by the front inner wall surface FH and the rear inner wall surface RH is preferably 20° to 50° in the cross section orthogonal to the rotation center line C of the drill 10. Where the diameter of the drill 10 is represented by D, the curvature radius D1 of the outer circumferential inner wall surface OH is preferably 0.25D to 0.35D, while the curvature radius R2 of the inner circumferential inner wall surface IH is preferably 0.15D to 0.20D. Since the inner circumferential inner wall surface IH is a partially cylindrical surface with the curvature radius R2 whose center lies on the rotation center line C as described above, the web thickness of the drill 10 can be made large enough and, therefore, the tool rigidity, or particularly, the bending rigidity is not reduced. If the curvature radius D1 of the outer circumferential inner wall surface OH falls below 0.25D or the curvature radius R2 of the inner circumferential inner wall surface IH falls below 0.15D, the web thickness of the drill 10 and the cross-sectional area of the cutting fluid supply hole 22 are difficult to be made large enough. Conversely, if the curvature radius D1 of the outer circumferential inner wall surface OH exceeds 0.35D or the curvature radius R2 of the inner circumferential inner wall surface IH exceeds 0.20D, the position of the cutting fluid supply hole 22 in the land 24 is offset toward the outer circumferential side and the strength of the drill 10 is difficult to be made large enough.

According to the drill 10 with the cutting fluid supply hole of this example, where the reference line OO' is a straight line connecting the center line C of the drill 10 and the radially outermost point O' of the wall surface 18f facing forward in the rotation direction and defining the discharge flute 18, the angle A2 of 20° to 50° is defined by the reference line OO' and the straight line OP indicative of the half angle A/2 of the angle A that is defined between the front inner wall surface FH and the rear inner wall surface RH. As a result, the cutting fluid supply hole 22 is located at a circumferentially center portion of the land 24 and, therefore, the tool rigidity is not reduced. If the angle A2 falls below 20° or exceeds 50°, the cutting fluid supply hole 22 is located close to the discharge flute 18 in the circumferential direction in the land 24 and, therefore, the tool rigidity may be reduced.

According to the drill 10 with a cutting fluid supply hole of this example, each adjacent two of the front inner wall surface FH, the rear inner wall surface RH, the outer circumferential inner wall surface OH, and the inner circumferential inner wall surface IH are smoothly connected to each other via the fillet T having a curvature radius of 0.015D to 0.045D. Since the fillet T as described above is disposed, the tool rigidity is not reduced. If the curvature radius R3 of the fillet T falls below 0.015D, the tool rigidity may be reduced. If the curvature radius R3 of the fillet T exceeds 0.045D, it is difficult to obtain the cross-sectional area of the cutting fluid supply hole 22 while maintaining the tool rigidity and the flow speed.

Although the example of the present invention has been described in detail with reference to the drawings, the present invention is applied in other forms.

For example, although the drill 10 of the example is provided with the two discharge flutes 18, the drill may be provided with the three or more discharge flutes 18.

The two cutting fluid supply holes 22 formed in the flute portion 16 of the drill 10 of the example may be connected to one cutting fluid supply hole longitudinally penetrating the shank portion 14 along the center line C. As a result, the cutting fluid supply amount enhancement effect based on the centrifugal force is further increased.

Although the drill 10 of the example is made up of the shank portion 14 and the flute portion 16, the drill 10 may be in a form having the flute portion 16 disposed on a distal end portion of a drill.

Although the drill 10 of the example has a diameter of about ø10 mm in this description, the drill may have a large diameter of ø16 mm to ø56 mm or may have two-stepped outer diameters (machining diameters).

Although another tool material such as high-speed steel is employable, the drill 10 of the example can be constituted by a substrate that is made of a super hard tool material such as cemented carbide. Intermetallic compounds, a diamond film, etc., are employable as a hard film disposed on the substrate, for enhancing the cutting durability.

The suitable intermetallic compounds are metals of the groups IIIb, IVa, Va, and VIa of the periodic table of the elements, for example, carbides, nitrides, and carbonitrides of Al, Ti, V, Cr, etc., or mutual solid solutions thereof and, specifically, TiAlN alloy, TiCN alloy, TiCrN alloy, TiN alloy, etc. are preferably used. Although a hard film of such an intermetallic compound is preferably disposed by a PVD method such as an arc ion plating method and a sputtering method, the hard film may be disposed by another film formation method such as a plasma CVD method.

The above description is merely an embodiment of the present invention and the present invention may be carried out in variously modified and improved forms based on the knowledge of those skilled in the art within a range not departing from the spirit thereof.

NOMENCLATURE OF ELEMENTS

10: drill 12: cutting edge 14: shank portion 16: flute portion 18: chip discharge flute 22: cutting fluid supply hole

24: land A: angle that is defined between a front inner wall surface FH and a rear inner wall surface RH A2: angle that is defined by a reference line OO' and a straight line OP indicative of a half angle A/2 of an angle A C: axial center (rotation center) R1, R2, R3: curvature radius

The invention claimed is:

1. A drill with a cutting fluid supply hole comprising: a tool main body provided with a cutting edge that is located at an axial end thereof, a flute portion having a discharge flute formed on a distal end side portion of the tool main body for discharging chips generated by the cutting edge, and a cutting fluid supply hole for supplying cutting fluid toward the cutting edge through the inside of the flute portion, the cutting fluid supply hole having a fan-shaped cross section defined by a front inner wall surface extending along a radial direction of the tool main body on the front side in the rotation direction of the drill, a rear inner wall surface extending along the radial direction on the rear side in the rotation direction of the drill and facing the front inner wall surface in a circumferential direction of the tool main body, an outer circumferential inner wall surface made up of a partially cylindrical surface around a center line of the drill, and an inner circumferential inner wall surface made up of a partially cylindrical surface around the center line of the drill with a curvature radius that is smaller than a curvature radius of the outer circumferential inner wall surface and facing the outer circumferential inner wall surface in the radial direction.

2. The drill with a cutting fluid supply hole of claim 1, wherein an angle defined by the front inner wall surface and the rear inner wall surface is 20° to 50° in a cross section orthogonal to a rotation center of the drill, and wherein where a diameter of the drill is represented by D, the curvature radius of the outer circumferential inner wall surface is 0.25D to 0.35D while the curvature radius of the inner circumferential inner wall surface is 0.15D to 0.20D.

3. The drill with a cutting fluid supply hole of claim 2, wherein where a reference line is a straight line connecting the center line of the drill and a radially outermost point of one of side-wall surfaces which define the discharge flute and which are opposed to each other in the rotation direction, an angle of 20° to 50° is defined by the reference line and a straight line indicative of a half angle of the angle defined by the front inner wall surface and the rear inner wall surface.

4. The drill with a cutting fluid supply hole of claim 1, wherein adjacent surfaces are smoothly connected to each other with a curvature radius of 0.015D to 0.045D, the adjacent surfaces being each adjacent two of the front inner wall surface, the rear inner wall surface, the outer circumferential inner wall surface and the inner circumferential inner wall surface, which are adjacent to each other.

* * * * *